No. 879,080. PATENTED FEB. 11, 1908
C. BUTTERS.
PROCESS OF TREATING SLIMES.
APPLICATION FILED SEPT. 7, 1906.
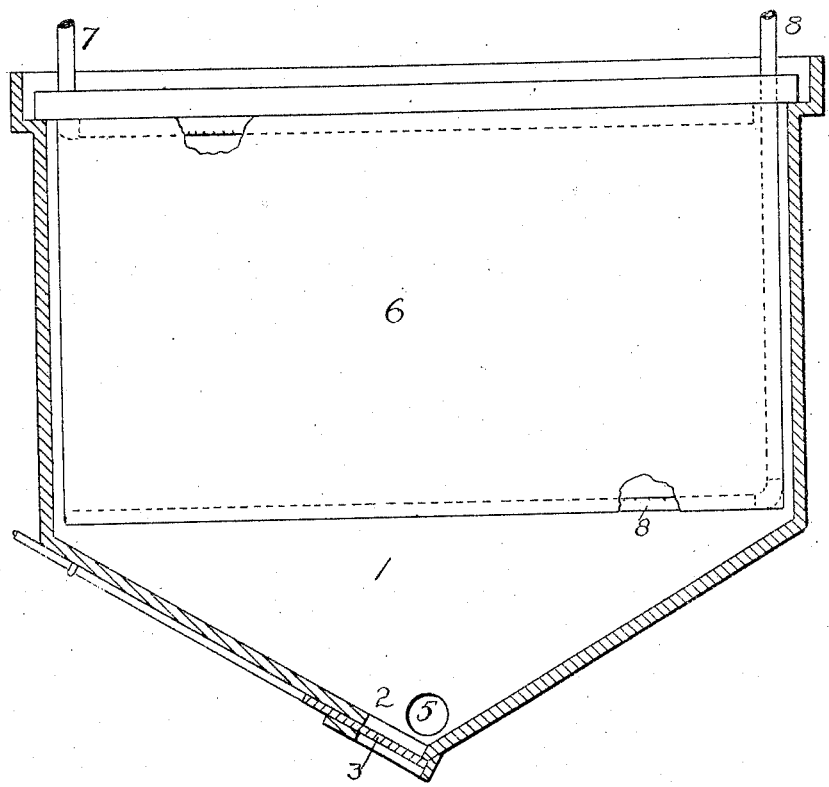
Witnesses
Harry A. Brooks
William T. Spilman
Inventor
Charles Butters
By
Mignon Ford
Attorney

UNITED STATES PATENT OFFICE.

CHARLES BUTTERS, OF BERKELEY, CALIFORNIA.

PROCESS OF TREATING SLIMES.

No. 879,080.

Specification of Letters Patent.

Patented Feb. 11, 1908.

Application filed September 7, 1906. Serial No. 333,731.

*To all whom it may concern:*

Be it known that I, CHARLES BUTTERS, a citizen of the United States, residing at Berkeley, in the county of Alameda and State of California, have invented certain new and useful Improvements in Processes of Treating Slimes; and I do hereby declare the following to be a full, clear, and exact description of the invention, such as will enable others skilled in the art to which it appertains to make and use the same.

This invention relates to hydro-metallurgical processes and has for its object the extraction of precious metals from finely divided particles of ore. A form of the apparatus by means of which this process may be carried on is illustrated in the accompanying sheet of drawing but is not minutely described, as it forms the subject matter of an application now pending, filed Dec. 27, 1905, Serial No. 293,481.

In said drawing, reference numeral 1 designates a tank or vat, the bottom of which is provided with an outlet 2, provided with a closure 3 of any suitable form. The upper portion of the vat is provided with a ledge 4, which forms the support for a filter frame 6, having tubes 7 and 8. Tube 7 is deflected horizontally after it passes into the interior of the frame 6 and has perforations on its lower side.

Tube 8 passes to the bottom of frame 6 and is deflected horizontally and has perforations upon its upper side. Frame 6 is provided with filtering fabric and means for holding said fabric in position, which are not here illustrated and described as they form no part of this application.

Pipe 5 is provided for introducing and removing the slimes and solutions into and from the vat.

In carrying on this process, the slimes, having been previously prepared and mixed with a quantity of lime or alkali, are discharged into the vat 1, until the filter 6 is submerged. The air being exhausted from pipe 8, a vacuum is formed in the interior of filter 6, said vacuum being maintained at as high a degree as the altitude of the locality where the process is carried on will permit. This causes a layer of the slimes to be deposited upon the surface of the filter 6. The vacuum is then reduced to approximately six inches of mercury. The slimes are now discharged from the vat 1 and the vat filled with a re-agent, such as a cyanid solution. The vacuum is then increased to the maximum whereby the re-agent is drawn through the cake of slimes, deposited upon the filter 6. The next step in the process consists in again reducing the vacuum and discharging the re-agent from the vat into a receptacle where it can be stored for future use. The vat is next filled with water and the vacuum increased, whereby the remaining values in the slimes are withdrawn through the filter. The final operation consists in admitting air through pipe 8, and water through pipe 7 into the interior of the filter, whereby the cake of slimes is discharged therefrom. The exhausted slimes may be discharged from the tank by opening the closure 3.

In localities where water is plentiful the cake may be discharged without the use of air.

The use of the lime in the slimes tends to incrust the surface and fill the interstices of the filter with compounds of lime. This is removed by immersing the filter in a bath of hydro-chloric acid, which may be drawn into the filter by attaching a suction pipe to the outlets of the filter. Water may also be forced into the filter after treatment with the hydro-chloric acid to free the filter from the compounds of lime.

I claim:

1. A process of treating slimes comprising filling a vat therewith, said vat having a filtering surface therein, creating and maintaining a maximum vacuum until a cake of the slimes is formed upon said surface, diminishing said vacuum, discharging the non-adhering slimes from the vat, filling the vat with a re-agent, increasing the vacuum until said re-agent is drawn through said cake, removing said re-agent, and discharging said cake by fluid pressure behind said surface.

2. A process of treating slimes comprising filling a vat therewith, said vat having a filtering surface therein, creating and maintaining a maximum vacuum until a cake of the slimes is formed upon said surface, diminishing said vacuum discharging the non-adhering slimes from the vat, filling the vat with a re-agent allowing the re-agent to permeate the cake, removing said re-agent, and discharging said cake by fluid pressure behind said surface.

3. A process of treating slimes comprising filling a vat therewith, said vat having a filtering surface therein, creating and maintaining a maximum vacuum until a cake of the slimes is formed upon said surface, diminishing said vacuum, discharging the non-adhering slimes from the vat, filling the vat with a re-agent, increasing the vacuum until said re-agent is drawn through said cake, removing said re-agent, and discharging said cake by water and air pressure behind said surface.

4. A process of treating slimes comprising filling a vat therewith, said vat having a filtering surface therein, creating and maintaining a maximum vacuum until a cake of the slimes is formed upon said surface, diminishing said vacuum, discharging the non-adhering slimes from the vat, filling the vat with a re-agent allowing the re-agent to permeate the cake removing said re-agent, and discharging said cake by water and air pressure behind said surface.

5. A process of treating slimes comprising filling a vat therewith, said vat having a filtering surface therein, creating a vacuum behind said surface until a cake of the slimes is deposited thereon, reducing the vacuum, removing the non-adhering slimes from said vat, filling said vat with a re-agent allowing the re-agent to permeate the cake, removing said re-agent, filling the vat with a solvent and discharging the cake by fluid pressure behind said filtering surface.

6. A process of treating slimes comprising filling a vat therewith, said vat having a filtering surface therein, creating a vacuum behind said surface until a cake of the slimes is deposited thereon, reducing the vacuum, removing the non-adhering slimes from said vat, filling said vat with a re-agent, increasing the vacuum until said re-agent is drawn through said cake, decreasing said vacuum, removing said re-agent, filling the vat with a solvent, increasing said vacuum until the values are withdrawn from the cake and discharging the cake by fluid pressure behind said filtering surface.

7. A process of treating slimes comprising filling a vat therewith, said vat having a filtering surface therein, creating a vacuum behind said surface until a cake of the slimes is deposited thereon, reducing the vacuum, removing the non-adhering slimes from said vat, filling said vat with a re-agent, increasing the vacuum until said re-agent is drawn through said cake, decreasing said vacuum, removing said re-agent filling the vat with a solvent, increasing said vacuum until the values are withdrawn from the cake and discharging the cake by water and air pressure behind said filtering surface.

8. A process of treating slimes consisting of adding lime thereto, filling a vat with said slimes, said vat having a filtering surface therein, creating a vacuum behind said filtering surface whereby a cake of slimes is formed upon said surface, discharging said cake and treating said surface with hydro-chloric acid to remove calcareous deposits from said filtering surface.

9. A process of treating slimes consisting in adding lime thereto, filling a vat with said slimes, said vat having a filtering surface therein, creating a vacuum behind said filtering surface whereby a cake of slimes is formed upon said surface, discharging said cake and drawing hydro-chloric acid through said filtering surface.

10. A process of treating slimes consisting in adding lime thereto, filling a vat with said slimes, said vat having a filtering surface therein, creating a vacuum behind said filtering surface, whereby a cake of slimes is formed upon said surface, discharging said cake, drawing hydro-chloric acid through said filtering surface and forcing water outwardly through said surface.

In testimony whereof, I have signed my name to this specification, in the presence of two subscribing witnesses at Carlsbad, Austria, this fourth day of August, A. D. 1906.

CHARLES BUTTERS.

Witnesses:
JNO. STEEL TWELLS,
LUDWIG KOHN.